US010027243B2

(12) United States Patent
Mallory

(10) Patent No.: US 10,027,243 B2
(45) Date of Patent: Jul. 17, 2018

(54) AC OVERVOLTAGE PROTECTION CIRCUIT

(71) Applicant: SL Power Electronics Corporation, Ventura, CA (US)

(72) Inventor: Bill Mallory, Camarillo, CA (US)

(73) Assignee: SL Power Electronics Corp., Ventura, CA (US)

( * ) Notice: Subject to any disclaimer, the term of this patent is extended or adjusted under 35 U.S.C. 154(b) by 0 days.

(21) Appl. No.: 14/947,884

(22) Filed: Nov. 20, 2015

(65) Prior Publication Data

US 2017/0149236 A1    May 25, 2017

(51) Int. Cl.
*H02H 7/125*    (2006.01)
*H02M 7/06*    (2006.01)

(52) U.S. Cl.
CPC ............ *H02M 7/06* (2013.01); *H02H 7/1252* (2013.01)

(58) Field of Classification Search
CPC ........ H02H 7/12; H02H 7/125; H02H 7/1252; H02H 7/1255; H02H 7/1257
USPC ...................................... 363/50–54
See application file for complete search history.

(56) References Cited

U.S. PATENT DOCUMENTS

| 3,243,796 | A | * | 3/1966 | Harmon | H02H 3/353 |
| | | | | | 327/465 |
| 5,138,547 | A | * | 8/1992 | Swoboda | H02H 3/247 |
| | | | | | 361/190 |
| 6,816,352 | B2 | | 11/2004 | Hoopes | |
| 7,054,173 | B2 | * | 5/2006 | Rayner | H02M 5/458 |
| | | | | | 361/16 |
| 7,245,470 | B2 | | 7/2007 | Hoopes | |
| 8,098,468 | B2 | | 1/2012 | Zhu et al. | |
| 9,071,048 | B2 | | 6/2015 | Divan | |
| 2008/0225559 | A1 | * | 9/2008 | Yanada | H02M 3/33507 |
| | | | | | 363/44 |
| 2011/0110128 | A1 | * | 5/2011 | Malik | H02H 7/1255 |
| | | | | | 363/52 |

\* cited by examiner

*Primary Examiner* — Alex Torres-Rivera
(74) *Attorney, Agent, or Firm* — Alix, Yale & Ristas, LLP

(57) ABSTRACT

A power converter for operation from an AC power source may include a bridge rectifier having an input to receive an AC input voltage and an output to provide a DC voltage, the AC input voltage received from the AC power source through a fuse. An AC input overvoltage protection circuit may be configured to cause a short circuit across the AC input voltage in response to the DC voltage output from the bridge rectifier exceeding a predetermined voltage value for a predetermined period of time.

5 Claims, 4 Drawing Sheets

© SL Power Electronics 2015

© SL Power Electronics 2015

AC OVERVOLTAGE PROTECTION CIRCUIT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to power converters and specifically to power converters operating from an AC primary power source.

Description of the Related Art

FIG. 1A is a partial schematic diagram of a 480 volt 3 phase wye power distribution system widely used in industrial and commercial buildings in the United States. T1 is the secondary winding of a 3 phase power distribution transformer. The outputs from T1 are three AC voltages commonly identified as line A ($L_A$), line B ($L_B$), and line C ($L_C$). $L_A$, $L_B$, and $L_C$ are separated in phase by 120 degrees. The AC voltage between any two of $L_A$, $L_B$, and $L_C$ is nominally 480 volts RMS. The voltage between each one of $L_A$, $L_B$, and $L_C$ and a neutral (N) is nominally 277 volts RMS.

Large loads, such as air conditioning compressor motors and elevator motors may be powered by all three voltage phases (not shown). Smaller loads, such as building lighting fixtures, may be connected between any one of $L_A$, $L_B$, and $L_C$ and the neutral N. In FIG. 1A resistors $R_A$ and $R_C$ represent such loads.

FIG. 1B illustrates a failure mode in a 3 phase wye power distribution system in which the neutral connection is broken, either within the power distribution system or the customer premises. In the event of this failure, loads $R_A$ and $R_C$ do not receive 277 volts as expected. Rather, 480 volts is applied to the series combination of $R_A$ and $R_C$. The voltage applied to each of $R_A$ and $R_C$ depends upon their relative resistance values. For example, if $R_A$ is a relatively high power load having low resistance and $R_C$ is a low power load having high resistance, the voltage across $R_C$ may approach 480 volts.

FIG. 1C illustrates a similar failure mode in a split phase 120 volt/240 volt power distribution system commonly used in residential buildings in the United States. In this case, if the neutral connection is broken, loads $R_D$ and $R_E$ do not receive 120 volts as expected. Rather, 240 volts is applied to the series combination of $R_D$ and $R_E$. The voltage applied to $R_D$ and $R_E$ depends upon their relative resistance values. For example, if $R_D$ is a relatively high power load having low resistance and $R_E$ is a low power load having high resistance, the voltage across $R_E$ may approach 240 volts.

In an event of either of the AC input overvoltage conditions illustrated in FIG. 1B and FIG. 1C, the failure is likely to be prolonged, rather than transient. Thus equipment intended for operation from one phase of a multi-phase power distribution system may be subjected to an extended AC input overvoltage of more than 170% of the nominal input voltage. Failure or disruption of the operation of such equipment may be permitted so long as the failure occurs without creating a secondary hazardous condition such as a fire or an electrical shock hazard.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 2:
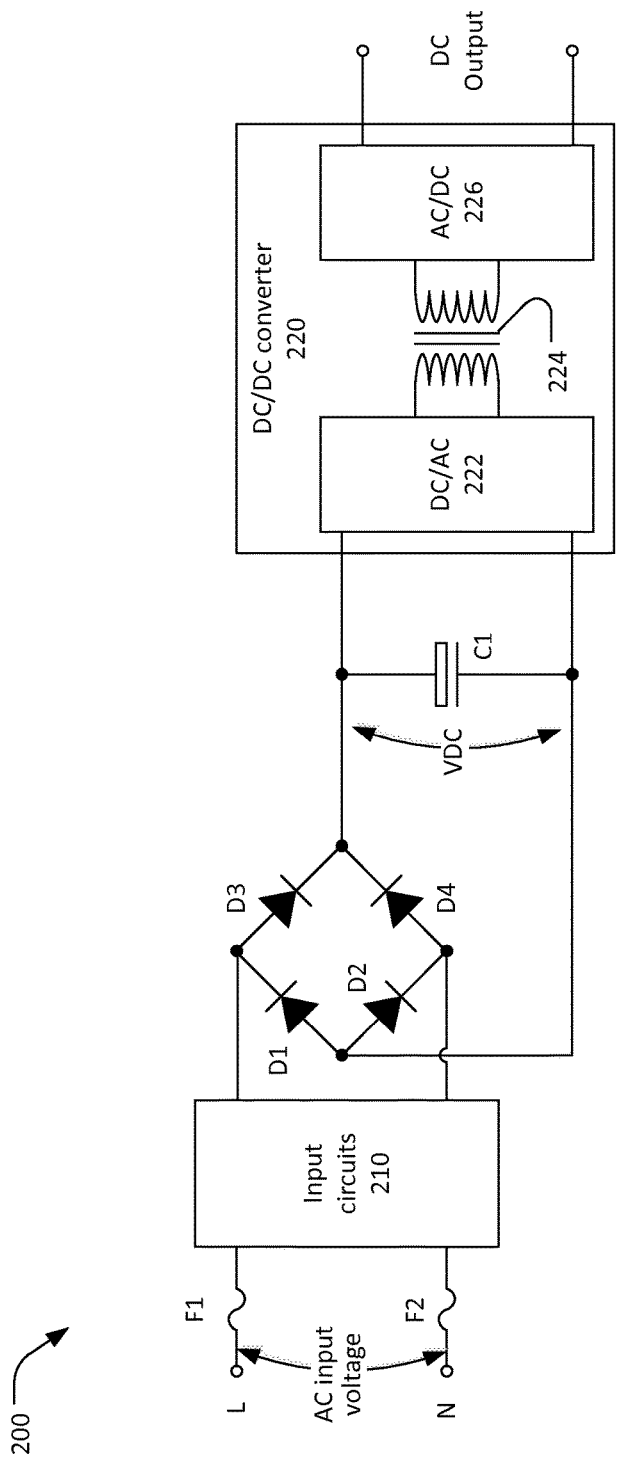
FIG. 2 is a block diagram of a prior art power converter.

Referring now to FIG. 2, a conventional power converter 200 may receive an AC input voltage through connections to an AC line (L) and a neutral (N). The line L may be one phase of a 480 volt three-phase power distribution system, in which case the nominal input voltage to the power converter 200 may be 277 volts RMS, and the possible sustained AC input overvoltage is 480 volts RMS. The line may be one side of a 120/240 volt power distribution system, in which case the nominal input voltage to the power converter 200 is 120 volts RMS, and the possible sustained AC input overvoltage is 240 volts RMS. The connection from the power converter 200 to the AC line L may be through a fuse F1. Optionally, the connection from the power converter 200 to the neutral N may be through a second fuse F2.

The power converter 200 may typically include input circuits 210, a bridge rectifier (diodes D1-D4), a filter capacitor C1, and a DC to DC converter 220. The input circuits 210 may include, for example, an inrush current limiter, an electromagnetic interference filter, and one or more transient suppression components, none of which are shown. The transient suppression components within the input circuits 210 may not be intended to, or capable of, suppressing a prolonged AC input overvoltage condition as illustrated in FIG. 1B and FIG. 1C.

After passing though the input circuits 210, the AC input voltage may be rectified by a bridge rectifier, comprising diodes D1-D4, to provide a DC voltage VDC across filter capacitor C1. The DC voltage VDC provides the input power for a DC-DC converter 220. Typically, the DC-DC converter 220 includes a DC/AC inverter 222, a transformer 224, and an AC/DC converter 226 to provide a DC output voltage. The DC/AC converter 222 may convert VDC into an AC voltage (commonly a square wave) at a much higher frequency than the frequency of the AC input voltage. The user of a higher frequency allows the transformer 224 to be correspondingly smaller than a transformer for operation at the frequency of the AC input voltage. Most power converters are designed to provide input-output isolation, which is to say isolation between the AC input voltage and the DC output voltage. Failure to provide input-output isolation can result in a potentially fatal shock hazard to users of equipment powered from the DC output voltage of the power converter.

Figure 1C:
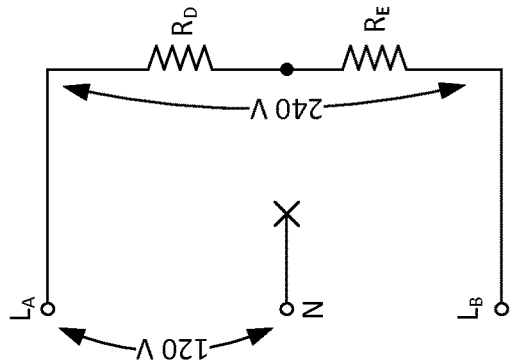
FIG. 1C is a partial schematic diagram illustrating an AC input overvoltage failure in a split phase 120/20 volt power distribution system.
Figure 1B:
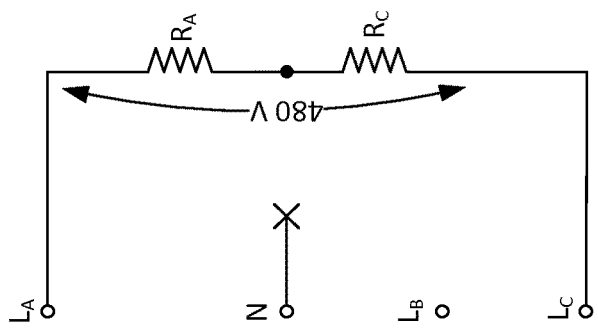
FIG. 1B is a partial schematic diagram illustrating an AC input overvoltage failure in a 480 volt 3 phase wye power distribution system.
Figure 1A:
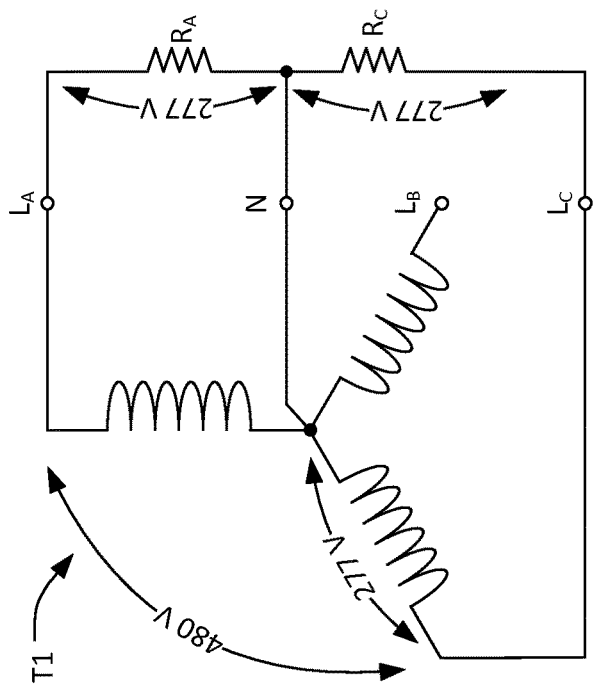
FIG. 1A is a partial schematic diagram of a 480 volt 3 phase wye power distribution system.

A nominal value of VDC is approximately the RMS AC input voltage times the square root of two, and the value of VDC in the AC input overvoltage conditions illustrated in FIG. 1B and FIG. 1C may be this nominal value multiplied by the square root of three. In the case of a power converter operated from one phase of a 480 volt three-phase power distribution system, the nominal VDC may be about 390 volts and the possible sustained overvoltage may be nearly 680 volts. In the case of a power converter operating from one side of a 120/240 volt power distribution system, the nominal VDC may be about 170 volts and the possible sustained overvoltage may be more than 290 volts.

The energy stored in any capacitor is proportional to the square of the DC voltage applied to the capacitor. The cost, physical size, and weight of a capacitor may also vary in rough proportion to the square of the rated maximum voltage. Constraints on the size and cost of many power converters preclude the use of a filter capacitor C1 with a maximum voltage rating above the possible sustained overvoltage. Typically, the capacitor C1 may be selected to have a maximum DC operating voltage 10% to 20% higher than the nominal value of VDC. For example, in the case of a power converter operated from one phase of a 480 volt three-phase power distribution system, filter capacitor C1 may have a maximum voltage rating of 450 volts DC. In the case of a power converter operating from one side of a 120/240 volt power distribution system, filter capacitor C1 may have a maximum voltage rating of 200 volts DC. In both cases, in the AC overvoltage conditions illustrated in FIG. 1B and FIG. 1C, the sustained value of VDC may be 40% to 50% higher than the maximum rated voltage of the filter capacitor C1.

In a typical power converter, the filter capacitor C1 is an aluminum or tantalum electrolytic capacitor, which means the capacitor contains a conductive liquid electrolyte. When an electrolytic capacitor is subject to a substantial overvoltage, the AC ripple current and the DC leakage current through the capacitor may increase dramatically. The increased AC and DC currents cause the internal temperature of the capacitor to rise. Increased internal temperature may cause a hazardous failure of the filter capacitor, which is to say a failure that has at least a potential to cause a hazardous condition such as an electrical shock hazard or a fire hazard.

For example, as the internal temperature of the filter capacitor increases, the conductive liquid electrolyte within the filter capacitor may expand, or even boil, resulting in leakage or venting of the conductive liquid electrolyte into the interior of the power converter 200. The presence of a conductive liquid within the power converter may result in unintended conduction paths. Of particular consequence, the presence of the conductive liquid within the power converter may create conduction paths between the AC input voltage and the DC outputs of the power converter, resulting an electrical shock hazard for users of equipment powered by the power converter. In summary, the AC input overvoltage conditions illustrated in FIG. 1B and FIG. 1C may result in catastrophic failure of a conventional power converter, and at least some of those failures can result in serious electrical shock hazards.

Figure 3:
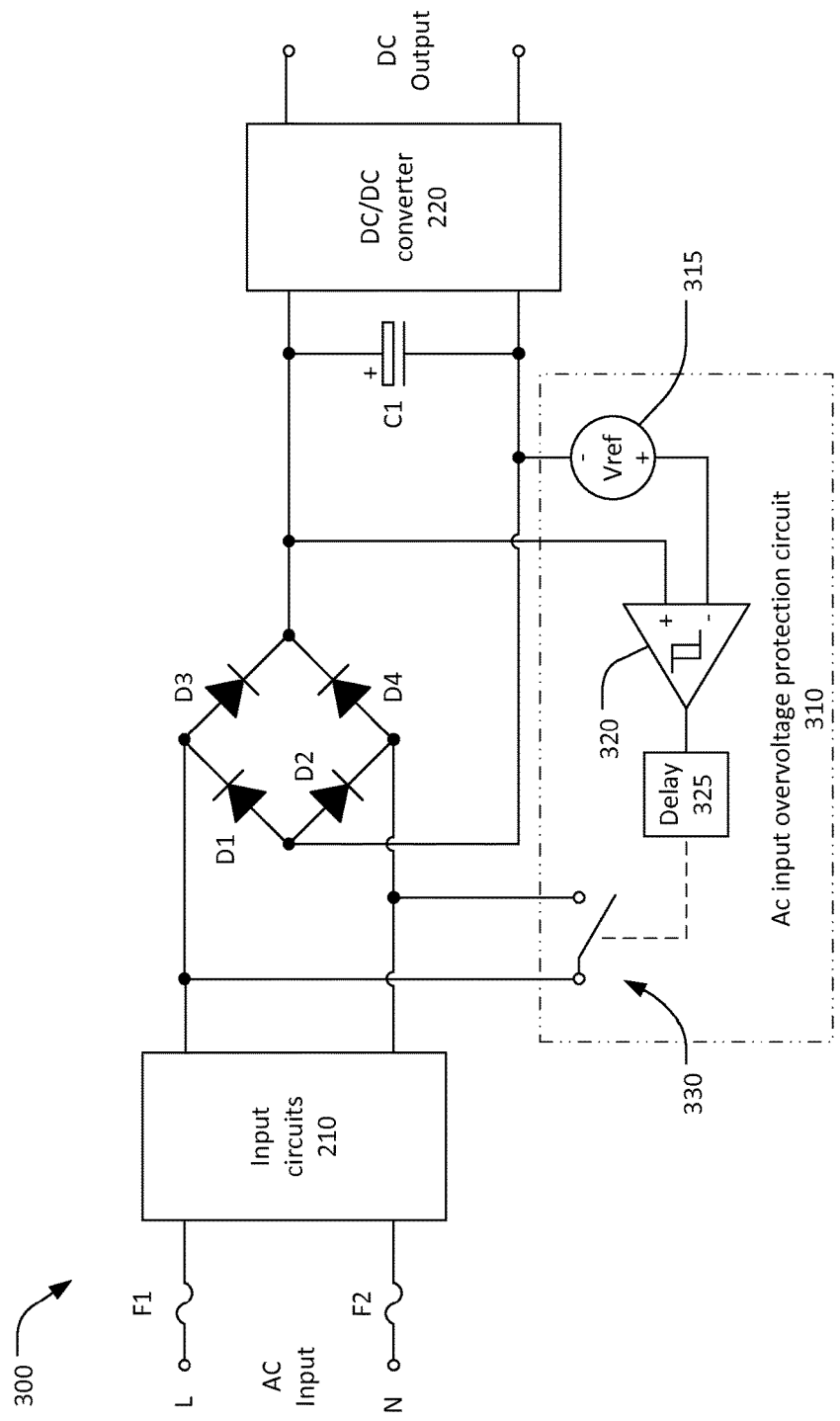
FIG. 3 is a block diagram of a power converter including an input overvoltage protection circuit.

Referring now to FIG. 3, an improved power converter 300 receives an input voltage through connections to an AC line (L) and a neutral (N) and provide a DC Output voltage. The line L may be one phase of a 480 volt three-phase power distribution system or one side of a 120/240 volt power distribution system. The power converter 300 includes fuses F1 and F2, input circuits 210, a bridge rectifier (diodes D1-D4), a filter capacitor C1, and a DC to DC converter 220. Each of these components has the same function as the corresponding components of the power converter 200 of FIG. 2. Descriptions of these components are not repeated here and are provided above in the discussion of FIG. 2.

The power converter 300 includes an AC input overvoltage protection circuit 310 intended to allow the power converter to fail gracefully in response to the AC input overvoltage conditions illustrated in FIG. 1B and FIG. 1C without creating an electrical shock hazard. The AC input overvoltage protection circuit 310 (shown within broken lines) includes a voltage reference function 315 that sets a voltage value Vref, a hysteretic comparator 320 to compare the voltage across capacitor C1 and Vref, and a normally-open switch 330 controlled by the comparator 320. The normally-open switch 330 may be a semiconductor device, such as a field-effect transistor (FET), or a mechanical switch. When the voltage across capacitor C1 exceeds Vref, the comparator 320 causes the normally-open contacts of switch 330 to close, causing a short circuit across the AC voltage at the input to the bridge rectifier.

The AC input overvoltage protection circuit 310 may also include a delay function 325 such that the comparator 320 causes switch 330 to close only if the voltage across the capacitor C1 exceeds Vref for a predetermined period of time. The predetermined period of time may be selected to prevent the AC input overvoltage protection circuit from reacting to transient overvoltage conditions that present no danger to capacitor C1. The predetermined period of time may be, for example, 1 ms, 2 ms, 10 ms, or some other duration. The delay function 325 may be implemented at the output of the comparator 320 (as shown), at the input of the comparator 320, or within the comparator 320.

Causing a short circuit across the AC voltage at the input to the bridge rectifier has several effects. First, no further current will flow through the bridge rectifier D1-D4 to capacitor C1. The voltage across capacitor C1 will begin to decay as the energy stored in the capacitor is delivered to the DC/DC converter 220. This prevents overheating of the filter capacitor C1 and possible discharge of the conductive liquid electrolyte into the interior of the power converter. Second, after a short delay, fuse F1 and/or fuse F2 will blow, disconnecting the power converter from the AC input voltage and preventing any further damage to the power converter. The hysteresis of the comparator 320 and the delay function, in combination, ensure that the short circuit across the AC voltage at the input to the bridge rectifier is maintained for a sufficient period of time for fuse F1 and/or fuse F2 to blow. For example, fuses F1 and F2 may be miniature surface mount fuses with a continuous current rating consistent with the normal operation of the power converter 300. F1 and and/or F2 may blow in as little as 1 ms if the current through the fuses is raised to 500% of their continuous current rating. Blowing either F1 or F2 causes the power converter 300 to fail gracefully in response to the AC input overvoltage conditions illustrated in FIG. 1B and FIG. 1C without creating an electrical shock hazard.

Figure 4:
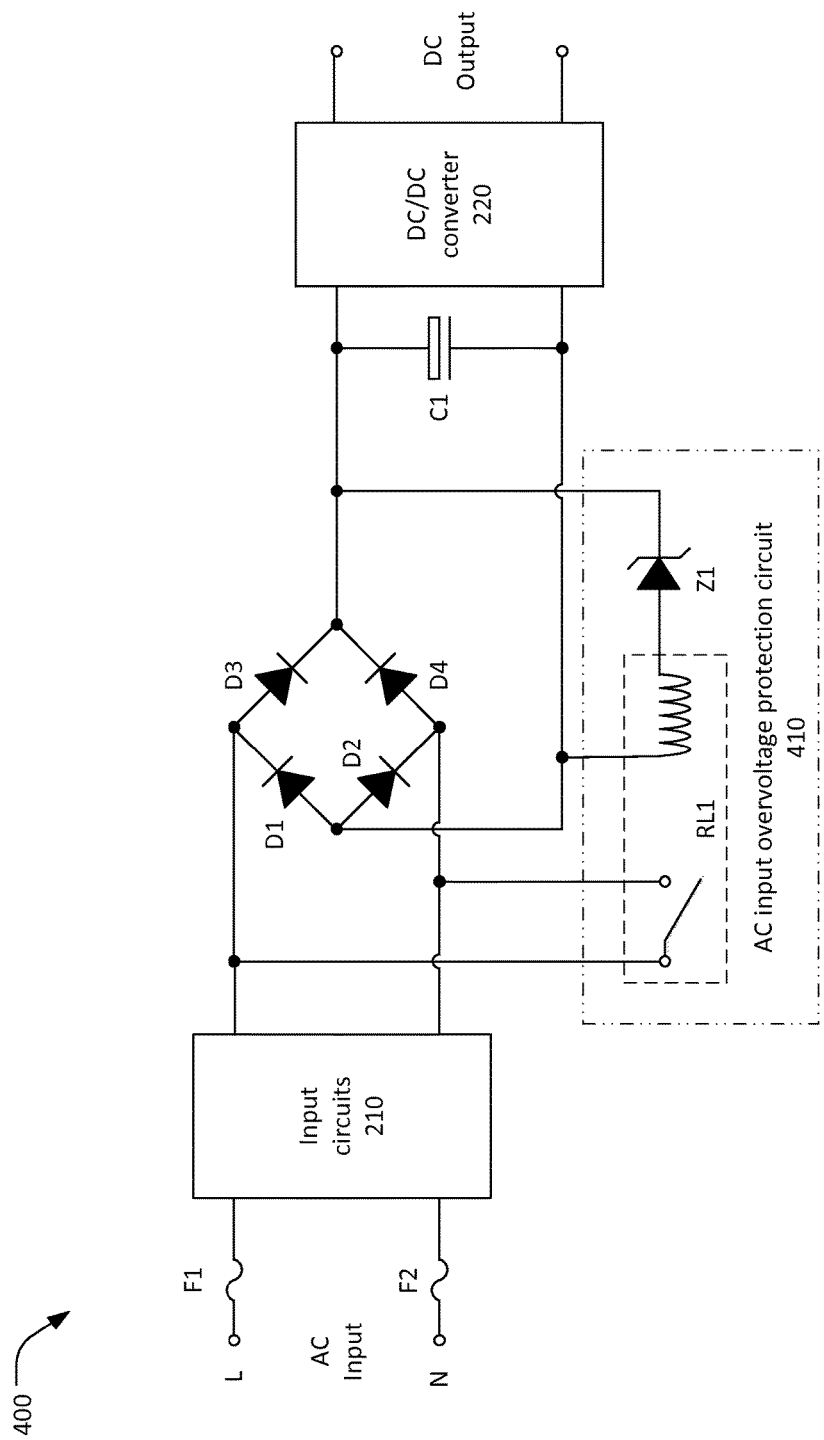
FIG. 4 is a block diagram of another power converter including an input overvoltage protection circuit.

Referring now to FIG. 4, an improved power converter 400 receives an input voltage through connections to an AC line (L) and a neutral (N) and provide a DC Output voltage.

The line L may be one phase of a 480 volt three-phase power distribution system or one side of a 120/240 volt power distribution system. The power converter 300 includes fuse F1, optional fuse F2, input circuits 210, a bridge rectifier (diodes D1-D4), a filter capacitor C1, and a DC to DC converter 220. Each of these components has the same function as the corresponding components of the power converter 200 of FIG. 2. Descriptions of these components are not repeated here and are provided above in the discussion of FIG. 2.

The power converter 400 includes an AC input overvoltage protection circuit 410 that implements the previously-described functions of the AC input voltage protection circuit 310 in a very cost-effective and reliable manner. The AC input overvoltage protection circuit 410 comprises a relay RL1 and one or more zener diodes Z1. Normally-open contacts of the relay RL1 are connected across the AC input voltage at the input to the bridge rectifier (diodes D1-D4). The zener diode Z1 is connected in series with the coil of the relay RL1, and the series combination of the zener diode Z1 and the coil of the relay RL1 is connected in parallel with the filter capacitor C1. The zener diode Z1 and the relay coil provide a comparison function like that of the comparator 320 shown in FIG. 3. The zener diode is selected such that the sum of a breakdown voltage of the zener diode and an actuation voltage of the relay coil (i.e. the coil voltage at which the relay contacts close) is equal to or greater than the maximum operating voltage of the filter capacitor C1.

In some cases, zener diode Z1 may be composed of two or more zener diodes in series to achieve a desired total breakdown voltage. For example, in the case of a power converter operated from one phase of a 480 volt three-phase power distribution system, filter capacitor C1 may have a maximum voltage rating of 450 volts DC and zener diode Z1 may be comprised of three 150-volt zener diodes in series.

During normal operation of the power converter 400, the voltage across filter capacitor C1 is less than the breakdown voltage of zener diode Z1 and only a very small leakage current may flow through Z1 and the coil of relay RL1. Thus the AC input overvoltage protection circuit 410 consumes only a negligible amount of power during normal operation and does not materially lower the efficiency of the power converter 400.

When the voltage across filter capacitor C1 exceeds the breakdown voltage of zener diode Z1, current will flow through Z1 and the coil of relay RL1. When the voltage across the coil of relay RL1 reaches the actuation voltage of the relay, the normally-open contacts will close. The relay RL1 provides the desired hysteresis because the release voltage of the relay RL1 is inherently lower than the actuation voltage. For example, the actuation voltage of a typical relay is 70% to 80% of the "rated" coil voltage, and the release voltage may be as low as 10% of the rated coil voltage. Once the voltage across capacitor C1 rises to a level that causes the relay contacts to close, the hysteresis of the relay ensures that the contacts will remain closed until the voltage across capacitor drops by at least a difference between the actuation and release voltage of the relay coil.

Continuing the previous example in which zener diode Z1 is implemented by three 150-volt zener diodes in series, assume the rated voltage of the coil of relay RL1 is 24 volts. In this case, the actuation voltage of RL1 may be about 18 volts (75% of the rated voltage) and the release voltage may be 2.5 volts (10% of the rated voltage). In this example, the relay contacts will close when the voltage across the capacitor C1 equals 468 volts (namely, 150×3+18) and will reopen when the voltage across the capacitor C1 falls to 452.5 volts (namely, 150×3+2.5).

Further, the relay RL1 is a mechanical component with inherently slow (compared to, for example, semiconductor switch) response time. The response time to activate or release the contacts of a miniature surface-mount relay is typically 1-2 milliseconds. Larger relays may have response times of 5-10 milliseconds or longer. The normally-open contacts of relay RL1 won't close during transient overvoltage conditions if the duration of the overvoltage is shorter than the relay response time. Relay RL1 may be selected to provide a desired predetermined delay before the normally-open contacts are closed.

When the normally-open relay contacts do close to cause a short circuit across the AC input to the bridge rectifier (D1-D4), the energy stored in the filter capacitor C1 does not discharge through the relay contacts. Rather, a portion of the energy stored in the filter capacitor C1 may discharge as current flowing through zener diode Z1 and the coil of relay RL1. The current flow from the filter capacitor C1, in combination with the inherent hysteresis and slow response time of relay RL1, cause the relay contacts stay closed for a sufficient time period to ensure that fuse F1 and/or fuse F2 blows.

The overvoltage protection circuit 410 is similar, in some aspects, to a semiconductor crowbar circuit used to protect against overvoltage conditions. Typically, a crowbar circuit uses a semiconductor switch such as a transistor or silicon controlled rectifier to short the output of a power converter in the event of an output overvoltage condition. Since the objective of the a typical crowbar circuit is to prevent overvoltage damage to circuits and devices powered by the power converter, a typical crowbar circuit is designed to respond to even very short transient overvoltage conditions.

The overvoltage circuit 410 exploits the inherent hysteresis and slow response of a mechanical relay to provide a solution to input overvoltage conditions using only a few components. This solution may be less complicated, smaller, more power efficient, and less costly than alternative solutions such as a semiconductor crowbar circuit with added delay and hysteresis.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A power converter for operation from an AC power source, comprising:
   a bridge rectifier having an input to receive an AC input voltage and an output to provide a DC voltage, the AC input voltage received from the AC power source through a fuse;
   a relay having a relay coil and normally open contacts, the normally open contacts connected across the AC input voltage; and
   one or more zener diodes in series connection with the relay coil, the series connection of the one or more zener diodes and the relay coil connected across the DC voltage, wherein
   the one or more zener diodes and the relay coil are configured such that the normally open contacts are closed to cause a short circuit across the AC input voltage when the DC voltage exceeds a predetermined voltage value for a predetermined period of time.

2. The power converter of claim 1, wherein the relay is configured to maintain the short circuit across the AC input voltage until the fuse opens.

3. The power converter of claim 1, wherein the predetermined period of time is equal to an actuation response time of the relay.

4. The power converter of claim 1, further comprising:
   a capacitor to filter the DC voltage, wherein
   the predetermined voltage is less than a voltage that causes a hazardous failure of the capacitor.

5. The power converter of claim 4, wherein
   the capacitor is an electrolytic capacitor, and
   the predetermined voltage is less than a voltage that causes venting of liquid electrolyte from the electrolytic capacitor.

\* \* \* \* \*